Figure 1:
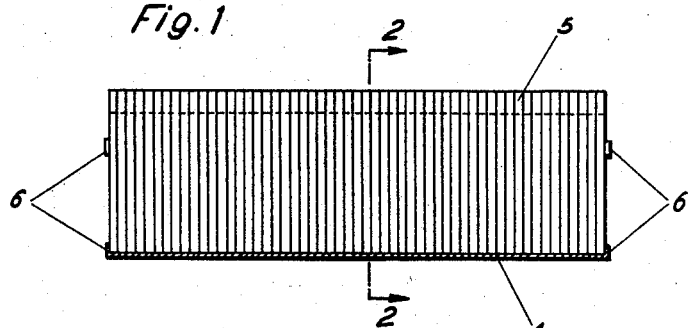

Oct. 20, 1959 G. FURNO ET AL 2,909,280
MEANS FOR ARRANGING, TRANSPORTING, DISTRIBUTING
AND RECEIVING COINS
Filed Dec. 6, 1956

INVENTORS:—
GAETAN FURNO
HENRI FURNO
By: Chatwin & Company
ATTYS.

Oct. 20, 1959  G. FURNO ET AL  2,909,280
MEANS FOR ARRANGING, TRANSPORTING, DISTRIBUTING
AND RECEIVING COINS
Filed Dec. 6, 1956  3 Sheets-Sheet 3

INVENTORS:
GAETAN FURNO
HENRI FURNO
By: Chatwin & Company
ATTYS.

United States Patent Office 2,909,280
Patented Oct. 20, 1959

2,909,280

MEANS FOR ARRANGING, TRANSPORTING, DISTRIBUTING, AND RECEIVING COINS

Gaetan Furno and Henri Furno, Paris, France

Application December 6, 1956, Serial No. 626,762

1 Claim. (Cl. 206—.82)

The invention has for its main object the provision of means for arranging, transporting, distributing and receiving coins and consists essentially:

(a) of flexible storage channels, receiving a predetermined number of coins of the same value and dimensions (preferably forming a round figure total value);

(b) of distributing channels with fixed opening, applicable by ordinary fixing to desks adapted to be folded for storing, closure or transport, even when they are more or less filled with the different coins for which they are provided; the said distributing channels being capable each of comprising a main base for a determined pile of coins (preferably corresponding to the capacity of a storing channel) and an adjoining base for supplementary coins of the same denomination;

(c) additionally, a grip specially arranged for the easy transfer of a pile of coins from one storage channel to a distributing channel or vice versa, or to other apparatus.

Further objects are means for the provision of the following:

(1) The flexible storage channels closed again in the empty state, can advantageously be provided at their extremities with abutment heel pieces coming into contact one with the other when the edges opposite the tightening edges of the pile of coins have been sufficiently brought close to permit of the introduction or withdrawal of the said coins. In this way there is no risk of bringing these edges too close together and thereby break or deform the flexible channel.

The abutment heel pieces in question have, in addition, the advantage of preventing the relative longitudinal sliding of two similar channels filled with coins and superposed.

(2) The bottom of the channels (both the storage and the distributing channels) can advantageously be graduated in a similar manner to the graduation of their edges, for the rapid counting of the contents of incompletely filled channels.

(3) The distributing channels can advantageously be secured to the desk by a lower engagement and lateral ear pressing between projections of the desk disposed conveniently to maintain the said channels on the said desk without the need of screws or the like. In this way the changing of the channels on the desk can be effected more rapidly and without the need of any tool.

Various embodiments are shown in the accompanying drawings.

Figure 2:
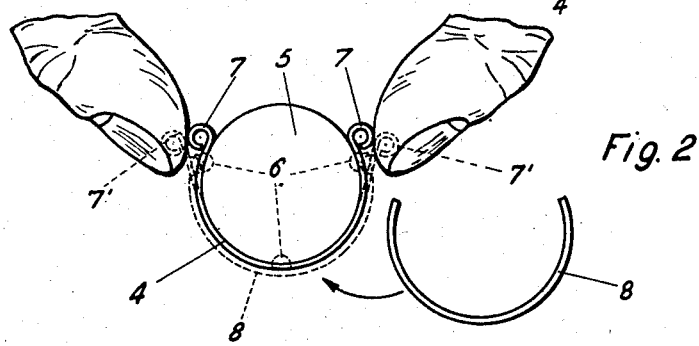
Figure 3:
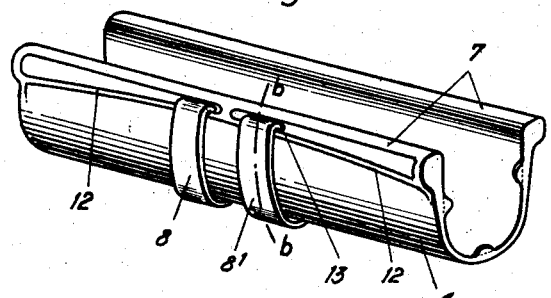
Figure 5:
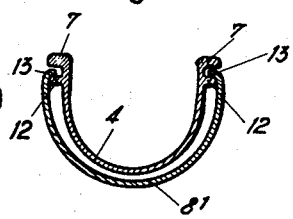
Figure 4:
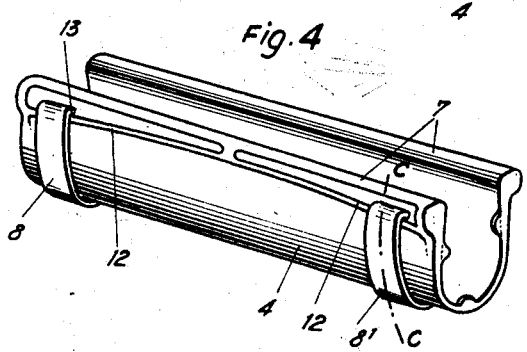
Figure 6:
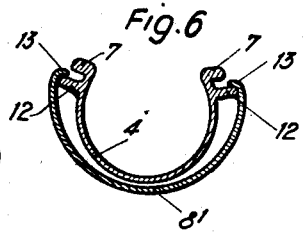
Figure 7:
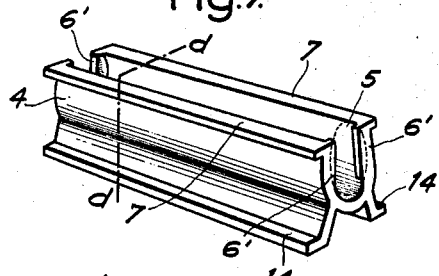
Figure 8:
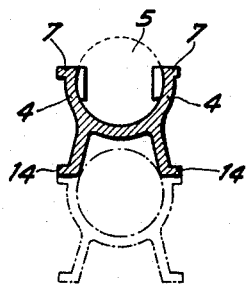
Figure 9:
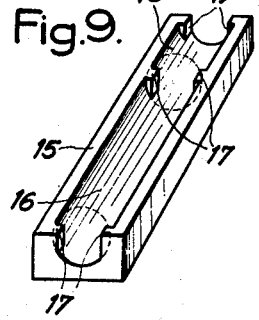
Figure 10:
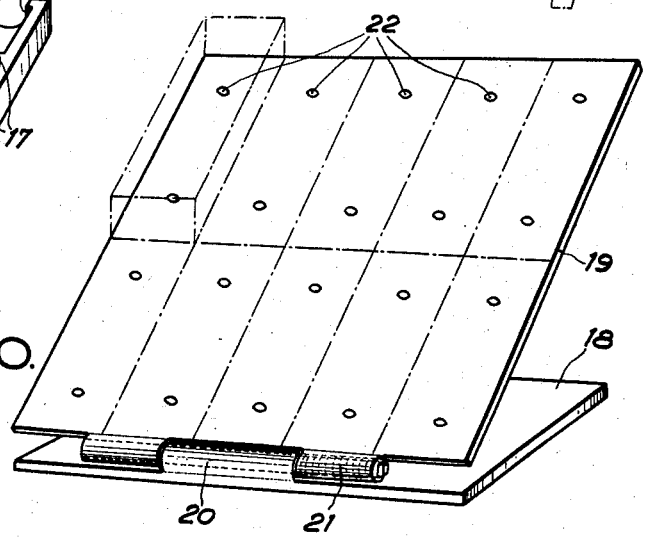
Figure 11:
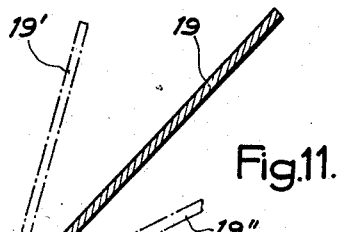
Figure 12:
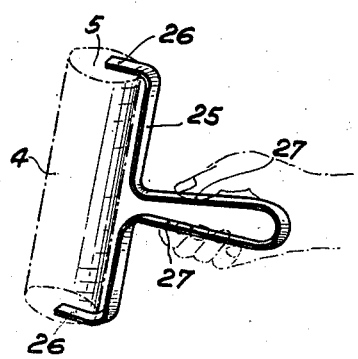

Figure 1 shows a longitudinal section and Fig. 2 a cross section taken on the line 2—2 of Fig. 1 of a constructional embodiment of a flexible storage channel partly open in the extended state and closed again by tightening cross-pieces. Figs. 3 and 4 represent in perspective respectively in open and closed position, a constructional embodiment of a flexible storage channel in which the tightening cross-pieces cannot be lost and act by sliding longitudinally. Fig. 5 is a section taken on the line b—b of Fig. 3; Fig. 6 is a section taken on the line c—c of Fig. 4. Fig. 7 is a perspective view of a constructional embodiment of a flexible storage channel closed again in the free and openable stage by bringing together the ribs opposite to the tightening edges of the pile of coins. Fig. 8 is a section taken on the line d—d of Fig. 7. Fig. 9 shows in perspective a constructional embodiment of a distributing channel with main base and adjoining base for coins of a particular value. Fig. 10 shows in perspective a constructional embodiment of a desk with adjustable inclination adapted to receive a certain number of distributing channels. Fig. 11 shows the said desk in section. Fig. 12 shows a constructional embodiment of a grip for the transfer of the piles of coins.

Figure 13:
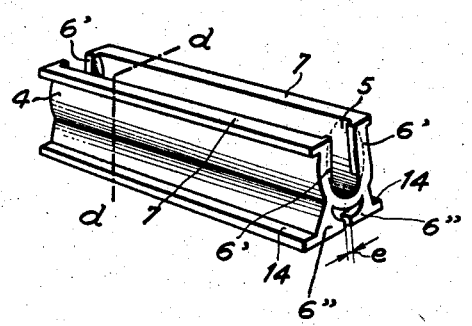
Figure 14:
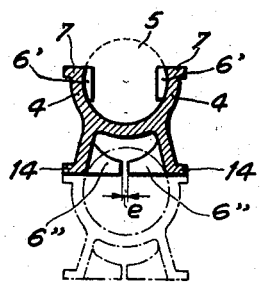
Figure 15:
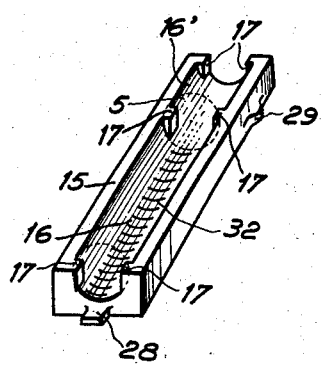
Figure 16:
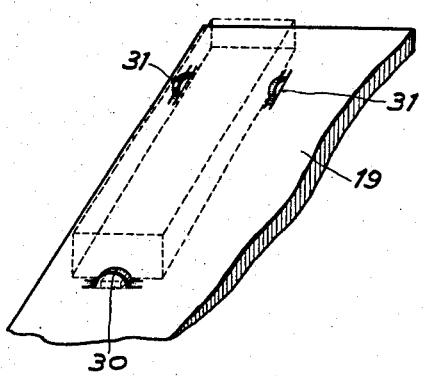

Fig. 13 represents in perspective a flexible storage channel; Fig. 14 is a section taken on the line d—d of Fig. 13. Fig. 15 represents in perspective a distributing channel with heel piece and lateral fixing ears. Fig. 16 is a fragmentary view of the desk arranged for the reception of distributing channels of this nature.

In these figures the same reference numerals denote the same parts.

In Figs. 1 to 8, 4 are flexible storage channels which form sorts of passages for the coins 5 and comprise at their extremities small feet 6 of pins $6^1$ retaining the said coins 5. The longitudinal edges 7 of the parts 4 are preferably graduated according to the stored coins to permit of counting rapidly the contents of the full or partly used channel-casings.

In Figs. 1 and 2 the longitudinal edges of the parts 4 are normally open as shown in broken lines at $7^1$ (Fig. 2) and in that position the coins 5 are freely introduced. But when the channel 4 is filled the operator tightens the edges 7 with his fingers to hold the coins 5 between the said edges 7 (position shown in full lines, Fig. 2) and in this position he forces over the exterior of the channel 4 one or more flexible cross-pieces or bands 8 which are much stiffer than the channels and which hold the latter in closed position for their handling as reserves.

In Figs. 3 to 6, 4 is the body of the channel-casing the edges 7 of which are normally open as shown at 5 in Fig. 3; 12 are the ramps which are integral therewith and over which can be moved the cross-pieces or bands 8 and $8^1$ to pass from the free position (Figs. 3 to 5) to the tightening position (Figs. 4 to 6) and so effect the retention of the coins ranged in the channel. It will be noted that in this case the cross-pieces or bands 8—$8^1$ comprise edges 13 bent inwardly which hold them integral with the channel-casing 4 even in the open position of the latter.

In Fig. 7 and 8 the channel body 4 is normally in tightening position on the coins 5 which cannot be withdrawn unless the operator brings together the ribs 14 which by oscillation causes the separation or moving apart of the edges 7. It is advantageously possible to give the ribs 14 a shape such that they can rest on the edges 7 of another similar channel 7 (see Fig. 8) without rolling or losing an appreciable space in view of grouped arrangement or packing.

In Fig. 9 a distribution channel 15 of rectangular external form, comprises two semi-circular bases the main one being 16 and the adjoining one $16^1$ and receiving the coins 5 of predetermined diameter. These bases are limited and separated by pins or noses 17. The base 16 preferably has a length equal to the contents of the storing channel whereas the base $16^1$ can be more or less long for it is intended to provisionally receive a surplus of coins whilst 16 is freed of its contents.

In Figs. 10 and 11 the desk comprises a stand or base 18 and an inclinable tablet 19 articulated to 18 by a hinge 20, tightened by an axial spring 21 in order to give sufficient firmness to the hinge so that 19 shall stay in the position selected by the operator for his convenience.

The tablet 19 has screw threaded holes 22 at appropriate distances apart to enable a number of channels 15 to be screwed thereto corresponding to the assortment of coins desired by the operator and which the latter can readily vary. It will be seen from Fig. 11 that the operator can easily place the tablet 19 at a slight inclination to the vertical as at 19¹ or at a greater inclination as at 19″ or can fold it down completely as at 19‴ for arranging. It will likewise be seen in Fig. 11 that the base 18 may comprise a clip 23 with screw 24 to permit of fixing the desk to the edge of a table or bureau in the case where space is wanting.

In Fig. 12 is shown a spring grip 25 with gripping fingers 26 normally open and with which the operator can easily, by pressing at 27, take hold of a whole pile of coins in a channel 4 to transport it to a base 16 or inversely or for filling of the tubes of an automatic apparatus or otherwise.

In Fig. 13 the channel-casing 4a is normally in a position holding the coins 5a tight the coins being only removable if the operator brings one or other of the ribs 14a together so causing by oscillation, the movement apart of the edges 7a. But in the form of construction shown there has been provided at both ends beneath the channel, heel pieces 6″ (of the same thickness as the pins or noses 6′ holding the extremities of the channel) which are distant from each other by an amount e determined in such a manner that when these heel-pieces abut one upon the other the channel is open for the introduction of the coins, but without excess pressure to that the material of the channel shall not be uselessly subjected to excessive fatigue. It will be seen in Fig. 14 that as these heel-pieces 6″ are not thicker than the pins or noses 6′, they do not prevent the superimposing of two channels loaded with coins and that in addition, they prevent any relative longitudinal sliding movement.

In Fig. 15 is shown a distributing channel 15a comprising two bases of semicircular form, the principal one 16a and the adjoining one 16′ receiving coins 5a of a determined diameter. The bases are limited and separated by pins or noses 17a. The base 16a preferably has a length equal to the contents of the storage channel whereas the base 16′ can be more or less long because it serves to provisionally receive a surplus of coins whilst channel 16a is being freed of its contents. For fixing it the body of the channel 15a has at its lower extremity a pin 28a and at its sides are ears 29a. There is shown in Fig. 16 the desk 19a comprising on the one hand arc-shaped members 30a to receive the pins 28a and arc-shaped members 31a which are sufficiently supple to enfold and retain in position the ears 29a.

Finally there will be seen in Fig. 15 an example of graduations 32a made on the bottom of the channels to facilitate the rapid counting of coins in the channels which are not completely full.

Naturally these forms of construction are given only by way of example and can vary to a large extent without affecting the characteristic features of the addition as hereinafter claimed:

Naturally the forms of constructions above described and shown are given only by way of example and may vary to a large extent without affecting the characteristic features of the invention claimed hereinafter.

We claim:

A coin holder comprising a body having a channel opening along one face thereof, said channel being in the form of the major part of a cylinder cut by a chordal plane, said cylinder having a slightly smaller diameter in its empty state, than the diameter of the coins to be stacked in said channel, a part of said body disposed centrally between the edges of the channel opening being resilient to permit opening of the channel for insertion of coins therein, two lugs projecting from the body at the edges of said resilient portion and remote from the edges of the channel, said lugs extending the length of said channel and being directed away from the edges of the channel whereby manual pressure applied to the free ends of the lugs to force them nearer together causes deformation of the body about the resilient portion, moving the edges of the channel farther apart for the insertion and removal of coins, said lugs having spaced, opposed heel members at both ends thereof for limiting the movement of said lugs toward each other, the lower surface of said heel members being in the plane of the lower face of said lugs.

References Cited in the file of this patent
UNITED STATES PATENTS

| | | |
|---|---|---|
| 854,158 | Engelsman | May 21, 1907 |
| 1,053,704 | Broadberry | Feb. 18, 1913 |
| 1,396,361 | Davidson | Nov. 8, 1921 |
| 2,280,003 | Pearson | Apr. 14, 1942 |